UNITED STATES PATENT OFFICE 2,368,903

SALTS OF ω-CYANOGUANIDODITHIO-CARBONIC ACID

Jack T. Thurston and Donald W. Kaiser, Riverside, Conn., assignors to American Cyanamid Company, New York, N. Y., a corporation of Maine No Drawing. Application June 7, 1943,
Serial No. 489,988

7 Claims. (Cl. 260—500)

This invention relates to new organic compounds and to their preparation.

We have discovered that the alkali metal salts of dicyandiamide can be caused to react with carbon disulfide to yield new compounds which we have named alkali metal ω-cyanoguanidodithiocarbonates.

The compounds of the present invention have in at least one of its tautomeric forms the following general formula:

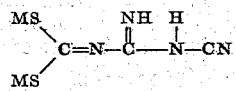

in which M is an alkali metal radical. It is quite likely, however, that the compounds may exist in whole or in part in one or more tautomeric forms, for example:

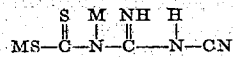

and, accordingly, we do not wish to be bound by the particular structure set forth. In view of the above, our new compounds may be called not only ω-cyanoguanidodithiocarbonates, but also ω-cyanoguanidodithioformates and ω-cyanoguanyl-dithiocarbamates. We prefer the nomenclature first given, however, since it represents the most probable structure of our compounds.

The reaction employed by us to prepare these new compounds may be illustrated by the following equation, using potassium dicyandiamide and carbon disulfide:

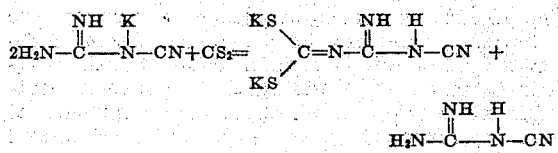

The reaction of carbon disulfide with other alkali metal salts of dicyandiamide takes place similarly.

In carrying out our new reaction we prefer to suspend an alkali metal salt of dicyandiamide in a water miscible, non-hydroxylated solvent, such as acetone or pyridine, and add carbon disulfide thereto in amounts sufficient to complete the reaction. Other solvents such as alpha-, beta-, and gamma-picoline, quinoline, 2,4-lutadine, methylethyl ketone, etc. may be used with less effectiveness. Although water may be present in the reaction mixture, the amount thereof should be kept at a minimum since alkali metal salts of dicyandiamide tend to dissociate in the presence of water and other hydroxylated solvents.

The reaction takes place readily over a wide range of temperatures. The higher temperatures, as above 65° C., should be avoided, however, since the product has a tendency to decompose at elevated temperatures. Ordinarily, temperatures ranging from —10° to 65° C. may be employed. Under these temperature conditions the reaction may require from 10 to 12 hours at —10° C. to 0.2 to 1.0 hour at 60° C. At 15 to 20° C., the reaction is usually complete in 15 minutes to 1 hour, the time depending somewhat upon the agitation of the reaction mixture, the physical condition of the dicyandiamide salt and the quantity of the reactants. Longer heating at moderate temperatures may be practiced to insure completion of the reaction.

Instead of reacting a previously prepared alkali metal dicyandiamide with carbon disulfide, we may prepare an alkali metal dicyandiamide in solution from aqueous solutions of alkali metal hydroxides and dicyandiamide by the method disclosed in the copending application of one of us, Donald W. Kaiser, Serial No. 440,879, filed April 28, 1942, now Patent No. 2,357,261 dated Aug. 29, 1944, and add the carbon disulfide to the solution containing the dicyandiamide salt. This procedure is advantageous in that it eliminates the necessity of first isolating the alkali metal dicyandiamide. This modification of our invention is illustrated in Example 2.

Our invention will now be illustrated in greater particularity by means of the following examples. It should be understood, however, that these examples are given for the purposes of illustration and are not to be construed as limiting our invention to the particular details described therein.

Example 1

19 grams of carbon disulfide was added to a stirred suspension of 24.4 g. of potassium dicyandiamide in 200 cc. of acetone. The mixture was then heated to refluxing temperature. Within a short time the outer surface of the potassium dicyandiamide crystals became yellow and the solution light in color. Refluxing was continued for 2.5 hours. The mixture was cooled, the pale yellow solid consisting of equi-molecular quantities of dipotassium ω-cyanoguanidodithiocarbonate and dicyandiamide was filtered, washed with acetone and dried in a desiccator. The product was purified by dissolving it in ice water and then treating the solution with acetic acid. Upon acidification a precipitate believed to be 2-thio-4,6-diamino-1,3,5-thiadiazine was thrown down. The precipitate was washed with water to remove dicyandiamide and other impurities and dried in an oven at 100° C. The washed precipitate can then be reconverted to dipotassium ω-cyanoguanidodithiocarbonate by adding it to a solution of KOH in methyl alcohol or vigorously stirring it with a slurry of KOH pellets in acetone. Light canary yellow microcrystals of dipotassium ω-cyanoguanidodithiocarbonate are thus obtained. The salt is highly soluble in water. Chemical analysis of the product gave results which checked closely with the theoretical values for dipotassium ω-cyanoguanidodithiocarbonate. The purified sample decomposed at 168° C.–174° C., depending on the rate of heating.

Example 2

To a warm solution of 127.5 g. (3.0 moles) of 97% sodium hydroxide in 400 cc. of water was added 126 g. (1.5 moles) of dicyandiamide and then 1200 cc. of acetone. Two clear layers resulted. The stirred mixture was cooled to 20° C. and 76 g. (1.0 mole) of carbon disulfide was added in a period of 10 minutes. The yellow mixture was stirred for 1 hour after addition of the carbon disulfide and then the acetone layer was removed by use of a separatory funnel. The product, sodium ω-cyanoguanidodithiocarbonate, is found in the aqueous layer and the solution containing the salt may be used directly in the synthesis of other organic compounds. If desired it may be recovered from the aqueous layer by acidification, with acetic or hydrochloric acid, which results in the precipitation of a solid material believed to be 2-thio-4,6-diamino-1,3,5-thiadiazine. The precipitate is recovered by filtration and washed well with water and dried in an oven at 100°. Sodium ω-cyanoguanidodithiocarbonate is regenerated when this material is added to a cold solution of NaOH in ethanol. This product may be isolated by filtration and washed with acetone or alcohol. Crystallization from ethanol gave beautiful light canary yellow plates which decomposed at 98–99° C. The material is extremely water soluble.

Example 3

To a warm stirred solution of 27.8 g. (0.42 mole) of 85% potassium hydroxide in 500 cc. of methanol was added 32 g. (0.20 mole) of finely powdered 2-thio-4,6-diamino-1,3,5-thiadiazine prepared as described in either of the preceding examples. A light yellow bulky precipitate immediately separated from solution. The material was broken up and then stirred for 10 minutes before it was filtered, washed with a little methanol, then acetone, and allowed to air dry. The light canary yellow plates decomposed at 168° C. and weighed 36 g. representing a 76.5% yield of dipotassium ω-cyanoguanidodithiocarbonate.

The preparation of our new compounds by the method just described of first preparing an alkali metal ω-cyanoguanidodithiocarbonate, converting it to 2-thio-4,6-diamino-1,3,5-thiadiazine and then reconverting it back is advantageous in that it allows us to obtain a product of high purity. This method also has the advantage in that the 2-thio-4,6-diamino-1,3,5-thiadiazine can be prepared from the most easily obtainable and economical alkali metal ω-cyanoguanidodithiocarbonate. Any other desired alkali metal ω-cyanoguanidodithiocarbonate can then be readily prepared by merely treating the 2-thio-4,6-diamino-1,3,5-thiadiazine with an appropriate alkali metal hydroxide by the method described in this example.

Example 4

To 400 cc. of denatured ethyl alcohol was added 17.85 g. (0.42 mole) of pulverized 97% sodium hydroxide. Before complete solution occurred, 32 g. (0.20 mole) of powdered 2-thio-4,6-diamino-1,3,5-thiadiazine was added. A large quantity of granular disodium ω-cyanoguanidodithiocarbonate immediately separated from the slightly warm mixture. The slurry was stirred and heated to reflux, giving almost complete solution. The yellow solution was filtered from dirt and the clear filtrate allowed to slowly cool. Beautiful pale yellow, plate-like needles of disodium ω-cyanoguanidodithiocarbonate were obtained which decomposed when heated at 98–99° C.

Our new compounds are useful primarily as intermediates in the preparation of new synthetic resins. They also find utility as intermediates in preparing compounds useful in leather finishing, textile treatment, dyestuffs, rubber accelerators and other arts.

What we claim is:

1. Alkali - metal ω-cyanoguanidodithiocarbonates.
2. Potassium ω-cyanoguanidodithiocarbonate.
3. Sodium ω-cyanoguanididothiocarbonate.
4. A method of preparing alkali metal ω-cyanoguanidodithiocarbonates which comprises treating an alkali-metal dicyandiamide with carbon disulfide in the presence of a water insoluble, non-hydroxylated solvent.
5. A method of preparing an alkali-metal ω-cyanoguanidodithiocarbonate which comprises treating an alkali metal dicyandiamide with carbon disulfide in the presence of acetone.
6. A method of preparing an alkali-metal ω-cyanoguanidodithiocarbonate which comprises treating an alkali metal dicyandiamide with carbon disulfide in the presence of pyridine.
7. A method of preparing alkali-metal ω-cyanoguanidodithiocarbonates which comprises the steps of suspending an alkali metal salt of dicyandiamide in a water-miscible, non-hydroxylated solvent and adding thereto carbon disulfide while maintaining the reaction mixture at a temperature not in excess of about 65° C. and separating therefrom an alkali-metal ω-cyanoguanidodithiocarbonate.

JACK T. THURSTON.
DONALD W. KAISER.